(12) United States Patent
Goussev

(10) Patent No.: US 6,814,221 B2
(45) Date of Patent: Nov. 9, 2004

(54) MULTI-LEVEL CONVEYING APPARATUS AND METHOD

(76) Inventor: Serguei Goussev, 45 Hepscott Terrace, Toronto, Ontario (CA), M1W 1C9

( * ) Notice: Subject to any disclaimer, the term of this patent is extended or adjusted under 35 U.S.C. 154(b) by 0 days.

(21) Appl. No.: 10/164,436

(22) Filed: Jun. 10, 2002

(65) Prior Publication Data

US 2003/0226739 A1 Dec. 11, 2003

(30) Foreign Application Priority Data

Jun. 6, 2002 (CA) .............................................. 2389436

(51) Int. Cl.[7] .............................................. B65G 37/00
(52) U.S. Cl. ...................................... 198/580; 198/435
(58) Field of Search .......................... 198/347.1, 347.4, 198/465.1, 435, 580

(56) References Cited

U.S. PATENT DOCUMENTS

| | | | |
|---|---|---|---|
| 1,377,644 A | | 5/1921 | Warrington |
| 1,531,847 A | | 3/1925 | Danforth et al. |
| 1,881,063 A | | 10/1932 | Randolph |
| 1,905,924 A | | 4/1933 | MacLauchlan |
| 4,196,802 A | * | 4/1980 | Lorentzen .................. 198/580 |
| 4,378,873 A | | 4/1983 | Cloudy |
| 4,890,718 A | * | 1/1990 | Colamussi .................. 198/435 |
| 5,201,403 A | * | 4/1993 | Haas et al. .................. 198/580 |
| 5,437,530 A | * | 8/1995 | Beckmann .................. 198/435 |
| 5,465,827 A | * | 11/1995 | Nakagawa et al. ......... 198/580 |
| 5,466,290 A | | 11/1995 | Berta |
| 6,336,549 B1 | | 1/2002 | Jen |

FOREIGN PATENT DOCUMENTS

JP 2-66020 * 3/1990 ................ 198/435

* cited by examiner

*Primary Examiner*—James R. Bidwell

(57) ABSTRACT

The present invention is directed to an apparatus and method for transfer of various objects along a multi-level conveyor in a number of pallets, which are transported between levels by two elevators simultaneously going up or down on each end of the conveyor. Since there are two elevators and several conveying levels, it is possible to change the path of movement of pallets along the conveyor, thus, providing control over the path and number of cycles the objects spend on the conveyor. Hence, such configuration allows to change position of one pallet relative to another. Present invention significantly minimizes the size of conveyor systems as well as it allows to manipulate the amount of time each pallet spends inside the system. Furthermore, since each pallet moves one step at a time different technological processes (i.e. loading/unloading, testing, measuring etc.) can be done with products when pallets are stationary.

9 Claims, 17 Drawing Sheets

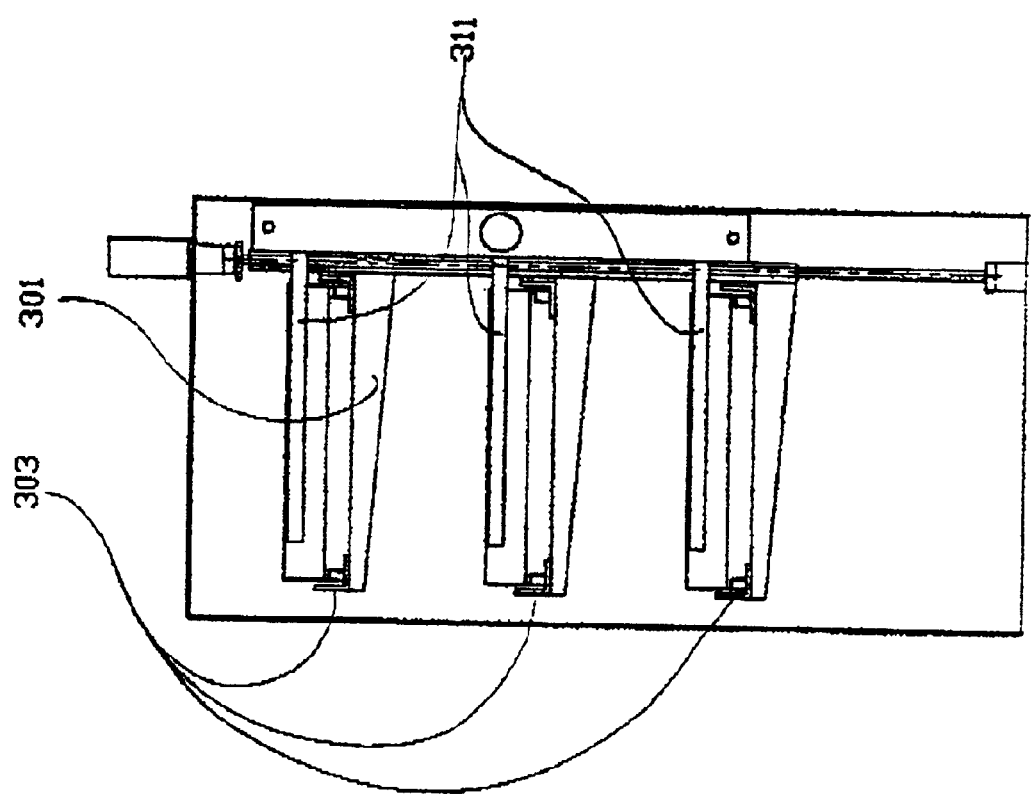

MULTI-LEVEL CONVEYING APPARATUS AND METHOD

FIELD OF THE INVENTION

The present invention relates to moving objects on a conveyor. In particular, the invention relates to a multi-level conveying apparatus and a method of moving objects on a multi-level conveyor.

BACKGROUND OF THE INVENTION

Multi-level conveying systems are widely used in manufacturing facilities, such as assembly lines or the like, for treating products. One example of a well known treatment is drying painted articles. Typically, the product being mass produced is placed into a series of trays or the like, which move along the conveyor from level to level while the product is treated. In order for the particular treatment, such as drying, to be completed, the product requires a predetermined retention time in a designated space. One example of a designated space is a dryer chamber.

U.S. Pat. No. 1,881,063 discloses a multi-level conveyor apparatus which include a conveyor bounded by two elevators which advance trays through the entire conveyor from the top level sequentially to the bottom level. An additional track structure is required to return the trays to their starting position on the top level. However, the additional track structure reduces the efficiency of the multi-level conveyor by occupying space which could be used to increase the length of the conveyance path.

U.S. Pat. No. 5,466,290 discloses a multi-level conveyor which includes two sections and three elevators. Two of the elevators are located on the sides of the conveyor and and a third elevator is located in the middle between the two sections.

The carrier units are sequentially moved from the bottom level to the top level of the 1St section of the conveyor using the left and middle elevators. Then the carrier units are moved to the 2nd section via the top level directly connecting the first and the second sections. The carrier units then are moved from the top level to the bottom level of the 2nd section using the middle and right elevator this time. In Berta's invention there are a number of limitations. For example, the side elevators are only designed to move carrier units in one direction; more specifically the left elevator moves the objects only up and the right elevator moves the objects only down. Secondly, Berta's invention offers no control over the retention of objects on the conveyor, meaning once the objects have entered the system, they all undergo a similar treatment with no variation. Furthermore, possibility of changing the order of carriers on the conveyor might be of great importance and the Berta's invention offers no such flexibility.

Consequently, there is a need for an improved multi-level conveyor and a method of moving objects on a multi-level conveyor, which reduces the space required for a given length of conveyance path and offers better efficiency, control and flexibility.

There are 3 key aspects to the current invention. The first aspect of this invention covers a multi-level conveying apparatus with one set of transfer means. The second aspect of this invention covers the said conveying apparatus comprising multiple sets of transfer means. The third aspect covers the method of moving objects along specified predetermined paths.

SUMMARY OF THE INVENTION

The first aspect of this invention is a conveying apparatus comprising a plurality of levels and one set of transfer means. One set of transfer means includes separate, but identical devices for vertical transfer of pallets each located in the elevators on different sides of the conveying apparatus.

The second aspect of this invention is a conveying apparatus comprising a plurality of levels and multiple sets of transfer means. Each set of transfer means includes separate, but identical devices for vertical transfer of pallets each located in the elevators on different sides of the conveying apparatus.

The third aspect of this invention is the method of moving objects, which allows for efficient, controlled and flexible movement of the pallets. Said method permits for pallets to circulate throughout the said conveying apparatus along the same or different paths in cycles numerous amounts of times or to transfer pallets from any starting point to any ending point.

BRIEF DESCRIPTION OF THE DRAWINGS

The invention will now be described by way of example only with reference to the accompanying drawings, in which:

FIG. 3C is a partial side view of the apparatus showing an elevator;

DETAILED DESCRIPTION OF THE INVENTION

Figure 1A:
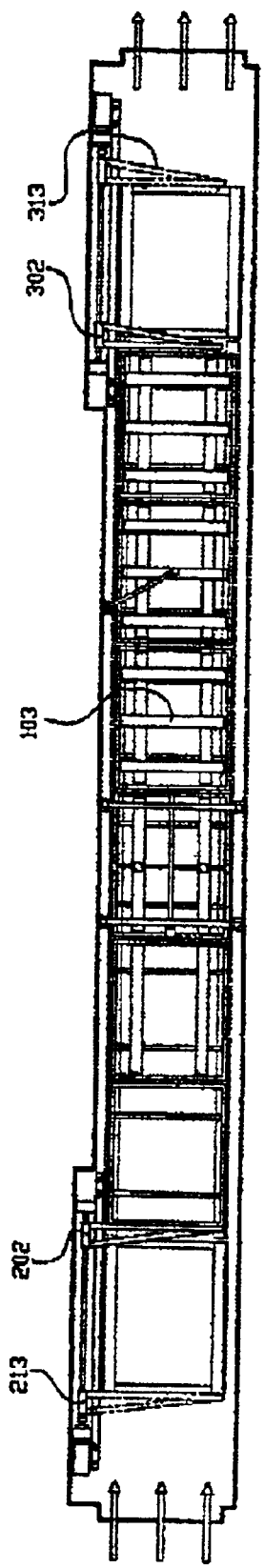
FIG. 1A is a plan view of a conveying apparatus according to a preferred embodiment of the present invention.
Figure 1B:
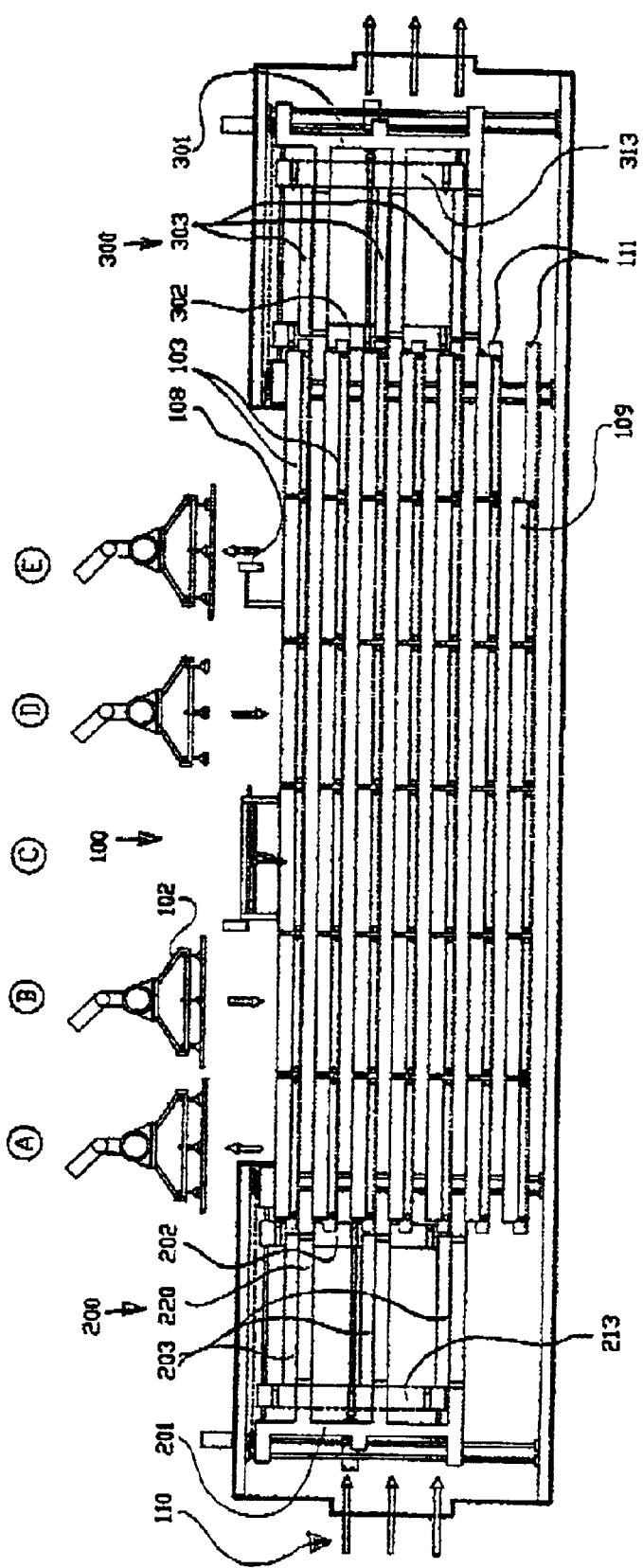
FIG. 1B is an elevation view of the apparatus.

Referring to FIGS. 1A and 1B, a conveyor 100 according to a preferred embodiment of the present invention is shown. To demonstrate the full potential of the present invention the preferred embodiment is presented with three sets of transfer means. Furthermore, for convenience, the preferred embodiment of the present invention is described in connection with drying plastic panels after, for example, assembly. However, it will be understood by those skilled in the art that the present invention may be used for any suitable application for a multi-level conveyor, including without limitation, freezing, warming, heating, irradiating, disinfecting, assembling, testing or melting of a wide variety of products.

Continuing to refer to FIGS. 1A and 1B, the conveyor 100 includes a plurality of spaced apart preferably horizontal levels 111. Preferably, a plurality of pallets 103 are provided on the conveyor 100 for receiving and retaining the product. However, it will be understood by those skilled in the art that any other suitable means for retaining a product may be provided. Alternatively, the product, such as, for example a car or the like, may be advanced along the surface the conveyor 100 without the use of pallets.

The pallets 103 are moved along the conveyor 100 from level to level by cooperative actions of first and second elevators 200, 300, as described in further detail below. Preferably, the starting position for each pallet 103 is below station A, where a plastic panel 101 is unloaded from each pallet 103, as it passes under Station A. A new plastic panel may be loaded onto each pallets 103 as it passes under station B. Preferably, the end position is indicated by reference number 109. The conveyor 100 may include additional stations C, D, and E where additional operations are performed. For example, glue may be applied to an item on each pallet 103 under station C, and an additional panel may be attached under station D. At station E, a conventional viewing station 108 may be provided to examine the contents of each pallet 103 and remove an article which does not meet quality control standards. Stations A–E utilize conventional robotic arms 102 or assemblers, which align, orient and dispense the products in each pallet 103.

The conveyor 100 is preferably located in a conventional dryer 110. The first elevator 200 and the second elevator 300 are located adjacent to each end of the conveyor 100. The dryer 110, and the elevators 200, 300 are aligned to permit airflow to pass over the pallets 103.

Figure 2C:
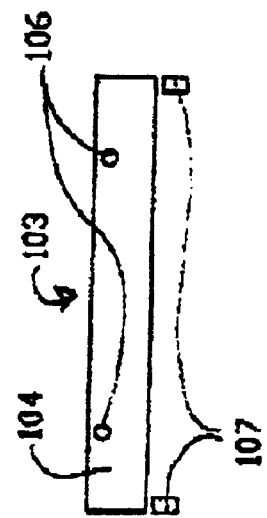
FIG. 2C is an elevation view of the pallet.
Figure 2A:
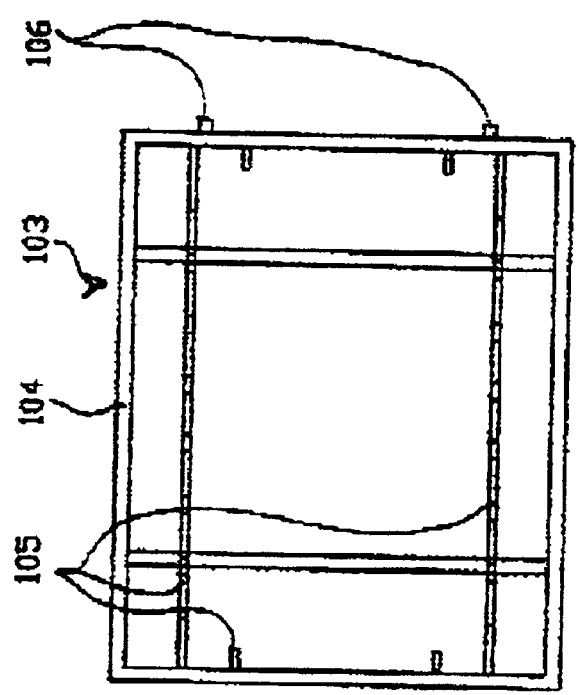
FIG. 2A is a plan view of a pallet for the apparatus.
Figure 2B:
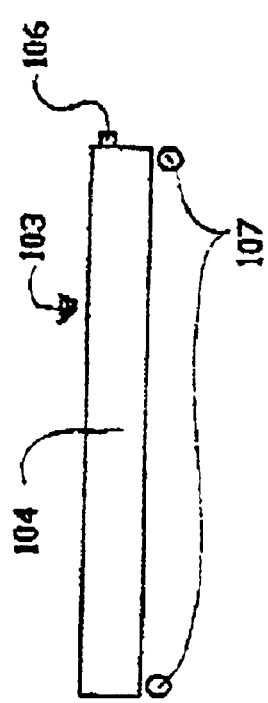
FIG. 2B is a side view of the pallet.
Figure 4A:
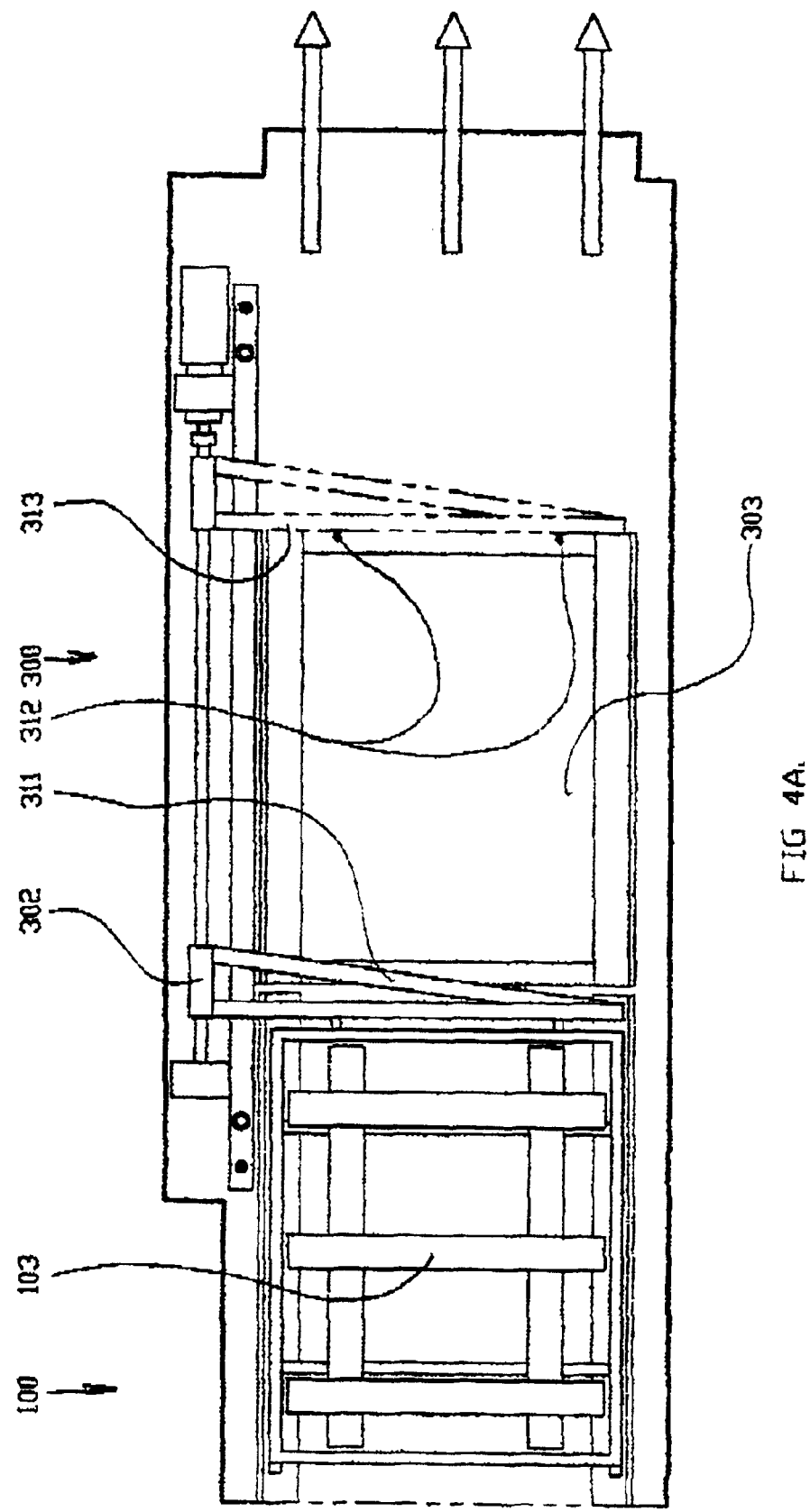
FIG. 4A is an enlarged side view of the second elevator.
Figure 4B:
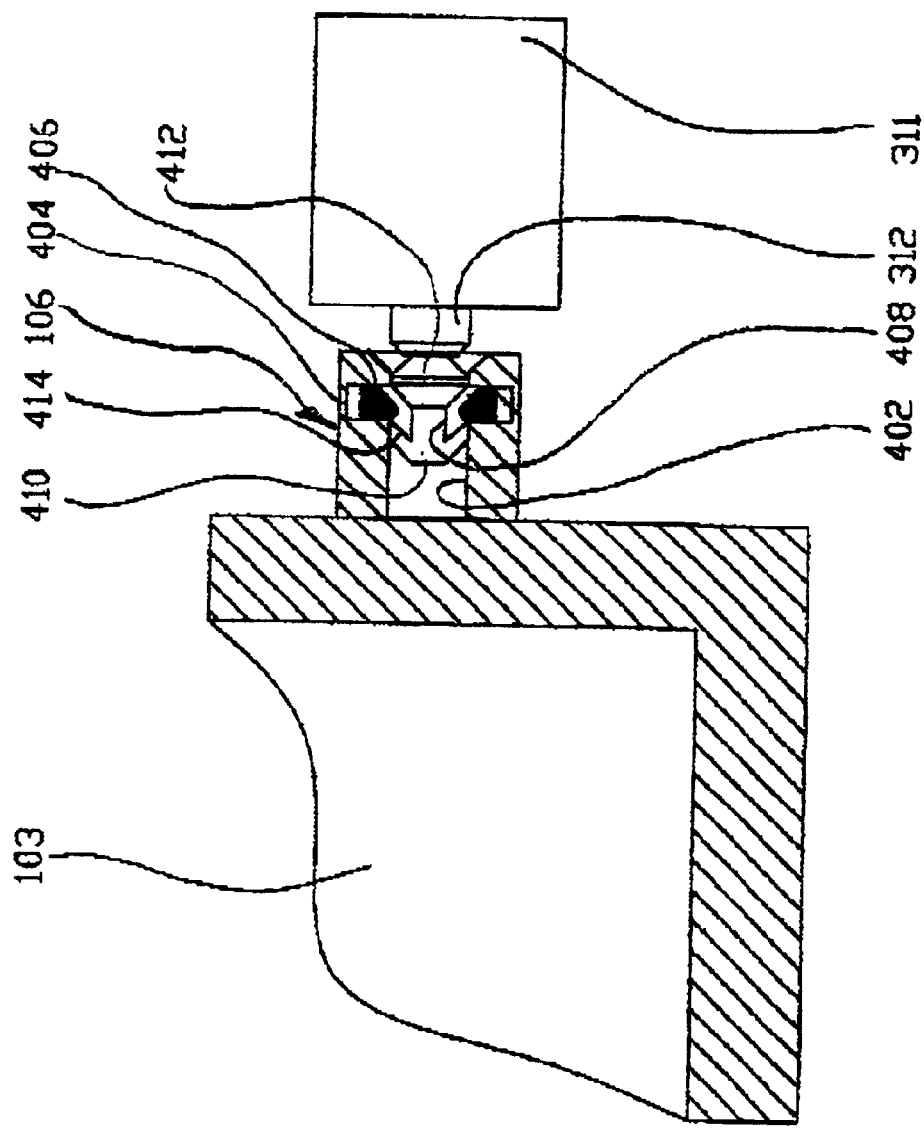
FIG. 4B is a partial cross-sectional view of the apparatus showing the grapple mechanism secured to the grapple housing in a position to withdraw the pallet from the conveyor.
Figure 4C:
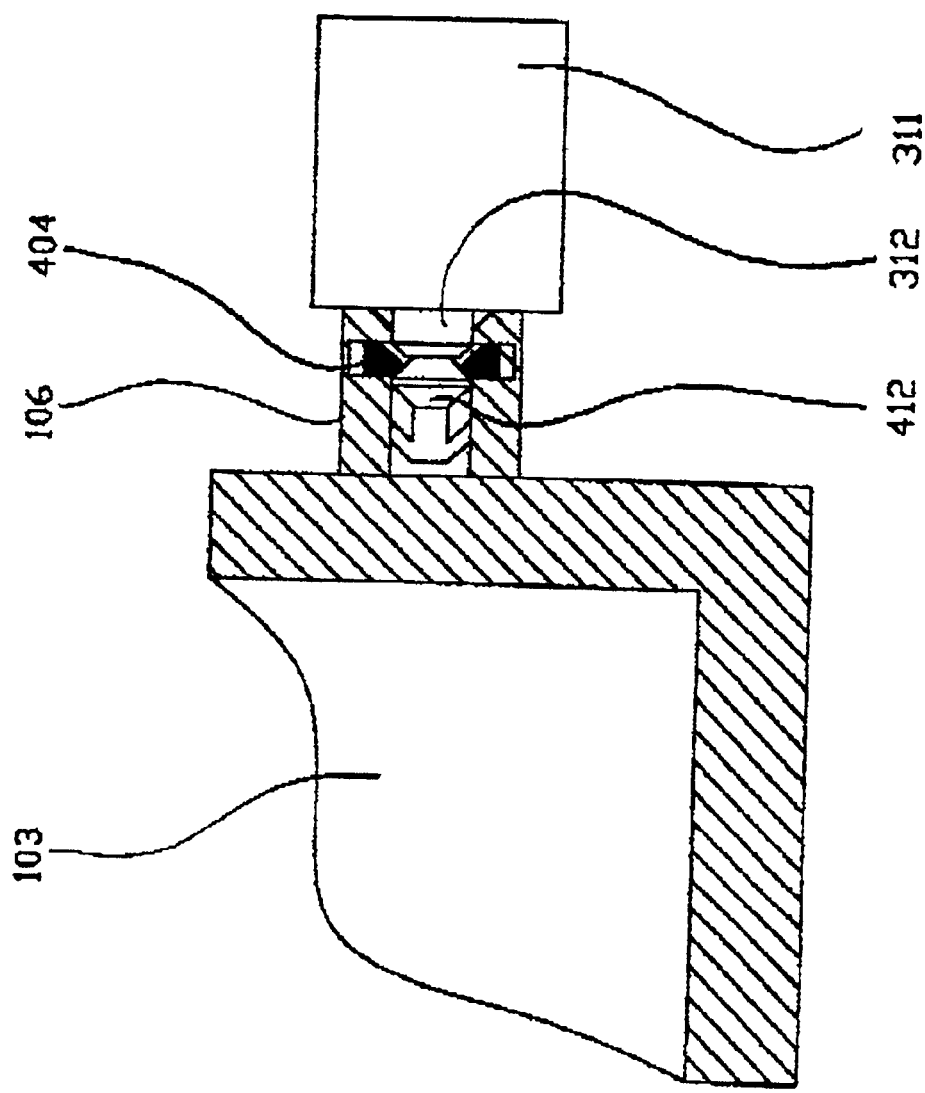
FIG. 4C is a partial cross-sectional view of the apparatus showing the grapple mechanism secured to the grapple housing in a position to insert the pallet into the conveyor.

As shown in FIGS. 2A–2C, each pallet 103 preferably includes frame 104, holder 105 which retains the panel in the pallet during drying, grapple housing 106, and preferably four wheels 107. As best shown in FIG. 4B, the grapple housing 106 has a cylindrical inner surface 402. A groove 404 is defined in the inner surface. Three spring-loaded latches 406 are movably received in the groove 404.

Figure 3A:
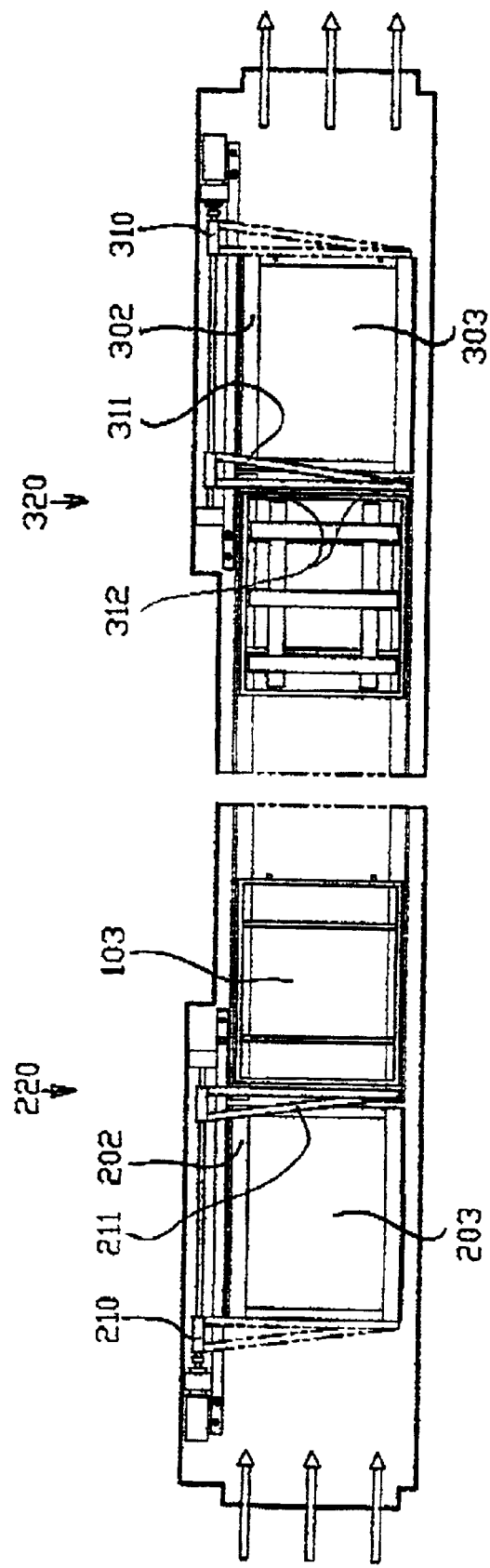
FIG. 3A is a partial plan view of the apparatus showing a first and second elevator.
Figure 3B:
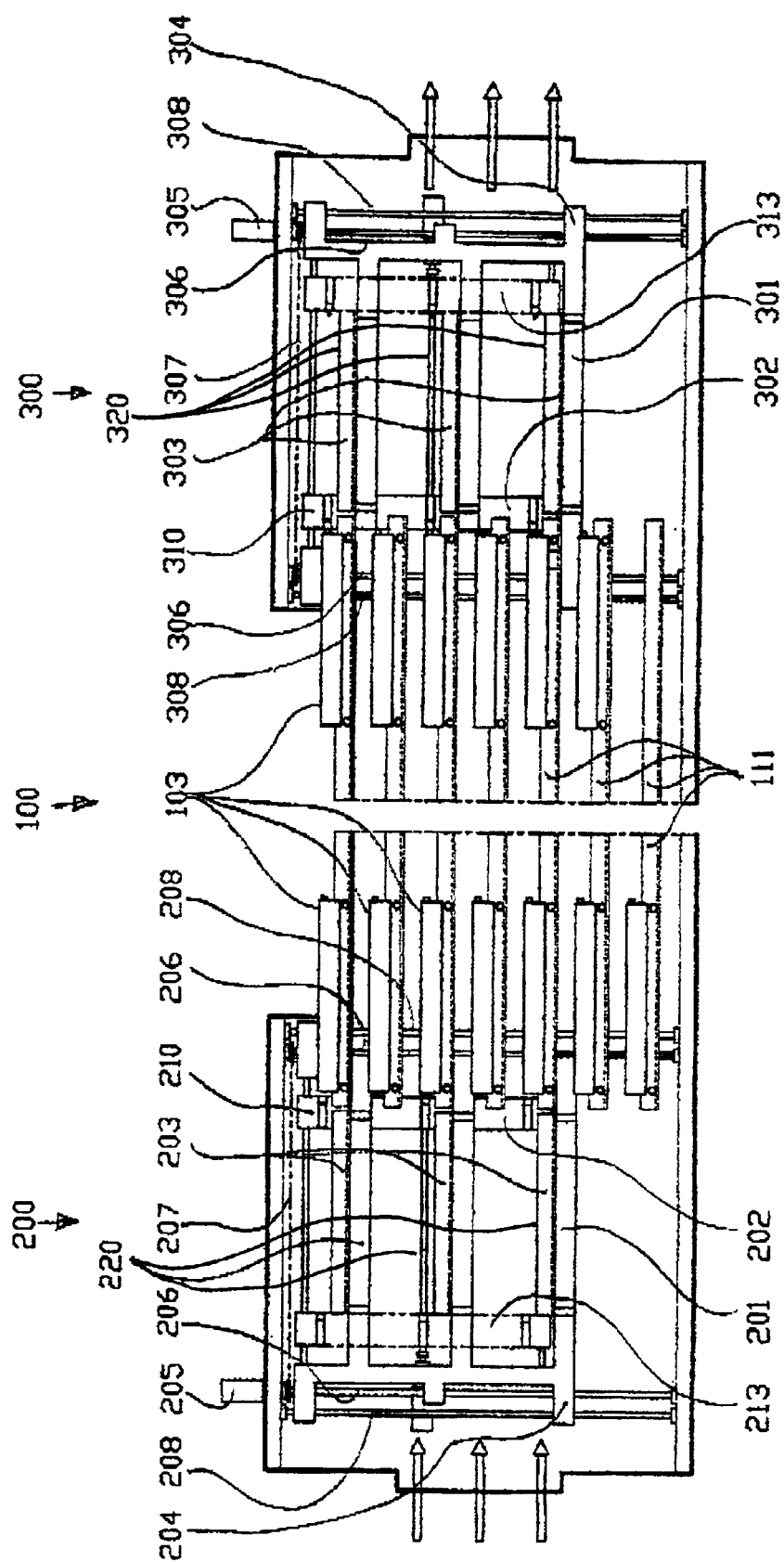
FIG. 3B is a partial elevation view of the apparatus showing a first and second elevator.

FIGS. 3A–3C show first and second elevators 200 and 300, respectively. Each elevator 200, 300 includes a lift mechanism 201, 301 for raising and lowering thereof. Both first and second elevators can transfer pallets from higher to lower levels as well as from lower to higher.

Referring to FIG. 3A, the first elevator 200 includes a plurality of spaced apart first transfer means 220 and the second elevator 300 includes a plurality of spaced apart second transfer means 320. The first and second transfer means 220, 320 are spaced apart the same distance as the levels 111 in order to align therewith. The first transfer means 220 and the second transfer means 320 may be vertically spaced apart by two levels of the conveyor 100. In addition, each first transfer means 220 is aligned with a corresponding second transfer means 320 on opposite ends of the conveyor 100. The first and second transfer means 220, 320 are moved between levels by the lift mechanism 201, 301 respectively. The first and second transfer means 220, 320 cooperate to remove pallets 103 from one level 111 of the conveyor 100 and insert pallets 103 in another level 111, as described in more detail below. In the preferred embodiment, three first and second transfer means 220, 320 are provided in the first and second elevator 200, 300, respectively, such that each of the corresponding pairs of first and second transfer means 220, 320 are positioned adjacent to opposite ends of three levels 111 and are spaced two levels apart, as best shown in FIG. 3B. It will be understood by those skilled in the art that any number of first and second transfer means 220, 320 may be provided, so long as the relationship between the number transfer means at each end of the conveyor 100 and number of levels is in accordance with the equation:

$$N_L = N_t \times A + 1$$

where $N_L$ is the number of levels; $N_t$ is the number of transfer means on one of the elevators; and A is the number of levels between transfer means on an elevator.

Continuing to refer to FIGS. 3A–3C, each first and second transfer means 220, 320 comprises a platform 203, 303, for receiving pallets 103, and a pusher 202, 302. Each pusher 202, 302 includes a sliding push bar 211, 311 which bears against a side of the pallet 103 when on the platform 203, 303. The platforms 203, 302 are moved by conventional vertical slide ball screw systems 204, 304. Each vertical slide ball screw system 204, 304 includes an actuator 205, 305, a screwed shaft 206, 306 which are connected with each other by endless chain 207, 307 and two vertical guide shafts 208, 308. Pushers 202, 302 are moved to by corresponding conventional horizontal slide ball screw systems 210, 310, which have a similar design to the vertical slide ball screw systems 204, 304. The push-bars 211, 311 push out pallets 103 from first and second elevators 200, 300 onto the conveyor 100.

Referring now to FIGS. 4A–D, push bar 311 includes a conventional self-releasing grapple mechanism 312 described in detail in *Mechanisms and Mechanical Devices Sourcebook* by Neil Selater and Nicolas P. Chironis, 3$^{rd}$ edition, p. 407, which is incorporated by reference herein. Referring to FIG. 4B, the grapple mechanism includes a rod 408 having a knob 410 connected to its distal end. The knob 410 has a recess 414 which accommodates a collar 412. The collar 412 slides on the rod 408. This grapple mechanism 312 removes pallet 103 from the conveyor 100 onto platform 303 of second elevator 300, and pushes out pallet 103 from platform 303 onto the conveyor 100 at another level 111, as described in more detail below. The grapple mechanism 312 releases pallet 103 from pusher 302 at the end of the stroke of the push bar 311.

The operation of the conveying apparatus according to a preferred embodiment of the present invention will now be described. Referring to FIG. 4A, pusher 302 of each second transfer means 320 is simultaneously moved from the full stroke position to the dwell position shown in phantom at 313. It will be understood by those skilled in the art that the word "simultaneously", as used herein, means not only "at the same instant", but can also include a delay between movement of transfer means, provided each transfer means in a particular elevator 200, 300 completes the appropriate action prior to movement of the elevator to its next position.

The action of this stroke of the pusher 302 causes grapple mechanism 312 (secured to the grapple housing 106) to move pallet 103 from the conveyor 100 onto the platform 303 of the second transfer means 320. As best shown in FIG. 3B, three pallets 103 are simultaneously removed from three levels 111 of conveyor 100 onto three second platforms 303 of three transfer means 320, in accordance with the preferred embodiment of the invention. The lift mechanisms 201, 301 move the first and second elevators 200, 300 to another level where the pallets 103 are inserted as described in detail below.

The push bar 311 of pusher 302 of each transfer means 320 moves from dwell position 313 to the full stroke position shown in FIG. 4A. The action of this stroke causes the three pallets 103 in second elevator 301 to be inserted into the conveyor 100. In addition, the stroke of the push bar 311 moves the collar 412 of the grapple mechanism 312 from the position shown in FIG. 4B to the position shown in FIG. 4C.

Referring to FIGS. 1B and 4A, pushers 202 and 302 are programmed by known means to work together, so that when pusher 302 pushes out pallet 103 from second elevator 301 onto conveyor 100, pusher 202 is in dwell position 213. The inserted pallet advances all of the other pallets on that level, such that pallet 103, which is adjacent to the first elevator 200, is transferred from the conveyor 100 onto the platform 203. Pushers 302 are then moved back to the dwell position 313. Simultaneously, grapple mechanism 312 releases the inserted pallet as described in detail below.

Figure 4D:
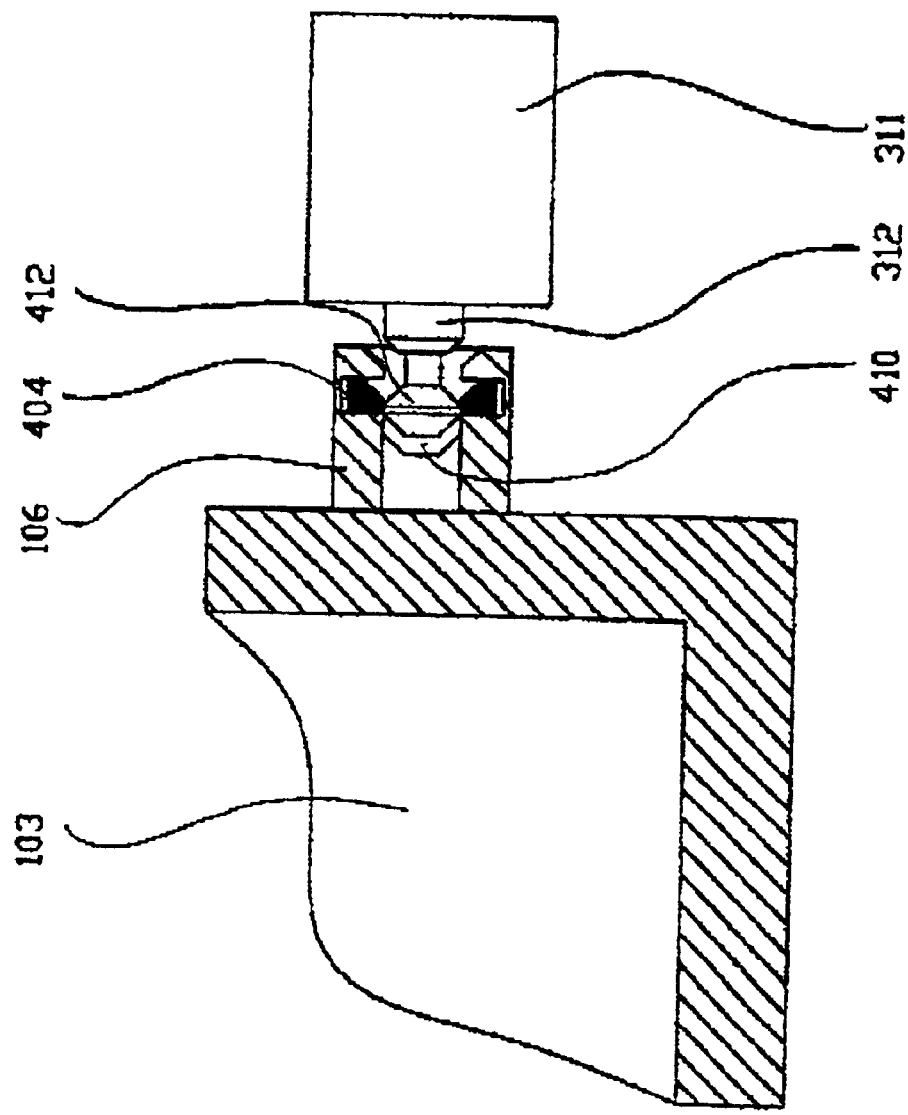
FIG. 4D is a partial cross-sectional view of the apparatus showing the grapple mechanism in a position to disengage from the grapple housing of the pallet.

Referring in FIG. 4D, as the grapple mechanism 312 begins to move away from the pallet 103, collar 412 is forced into the recess 414 (shown in FIG. 4B) in knob 410. The shape of the collar 412 permits the collar 412 to push the latches 402 into the groove 404 (shown in FIG. 4B) of grapple housing 106, thereby permitting the knob 410 to be released from grapple housing 106.

Referring again to FIG. 3B, lift mechanism 201 moves the first elevator 200 with pallet 103 on platform 203 to a position aligned with another level 111. The empty second elevator 300 is moved to align with the same level. The pusher 202 is moved from the dwell position 213 to the full stroke position. The action of this stroke causes the pallet 103 in first elevator 200 to be introduced into the conveyor 100 and to move the remaining pallets 103 on that level. Pusher 302 is then moved to the full stroke position and grapple mechanism 312 secures transfer means 320 to the adjacent pallet 103, as described in detail below. This cycle is then repeated continuously to advance the pallets 103 along the conveyor 100, as described in more detail below.

Referring now to FIG. 4B, the knob 410 of grapple mechanism 312 pushes latches 406 into groove 408 and enters the grapple housing 106. After knob 410 passes the latches 406, the latches spring back, thereby securing the knob 410 inside the grapple housing 106.

FIGS. 5 and 6 show the movement of the pallets on the conveyor through one cycle of first and second elevators 200, 300, in accordance with a preferred embodiment of the invention. To more clearly illustrate the pattern of movement, each the pallets 103 on the conveyor have been assigned reference numbers 1 to 41 in FIGS. 5 and 6.

Figure 5A:
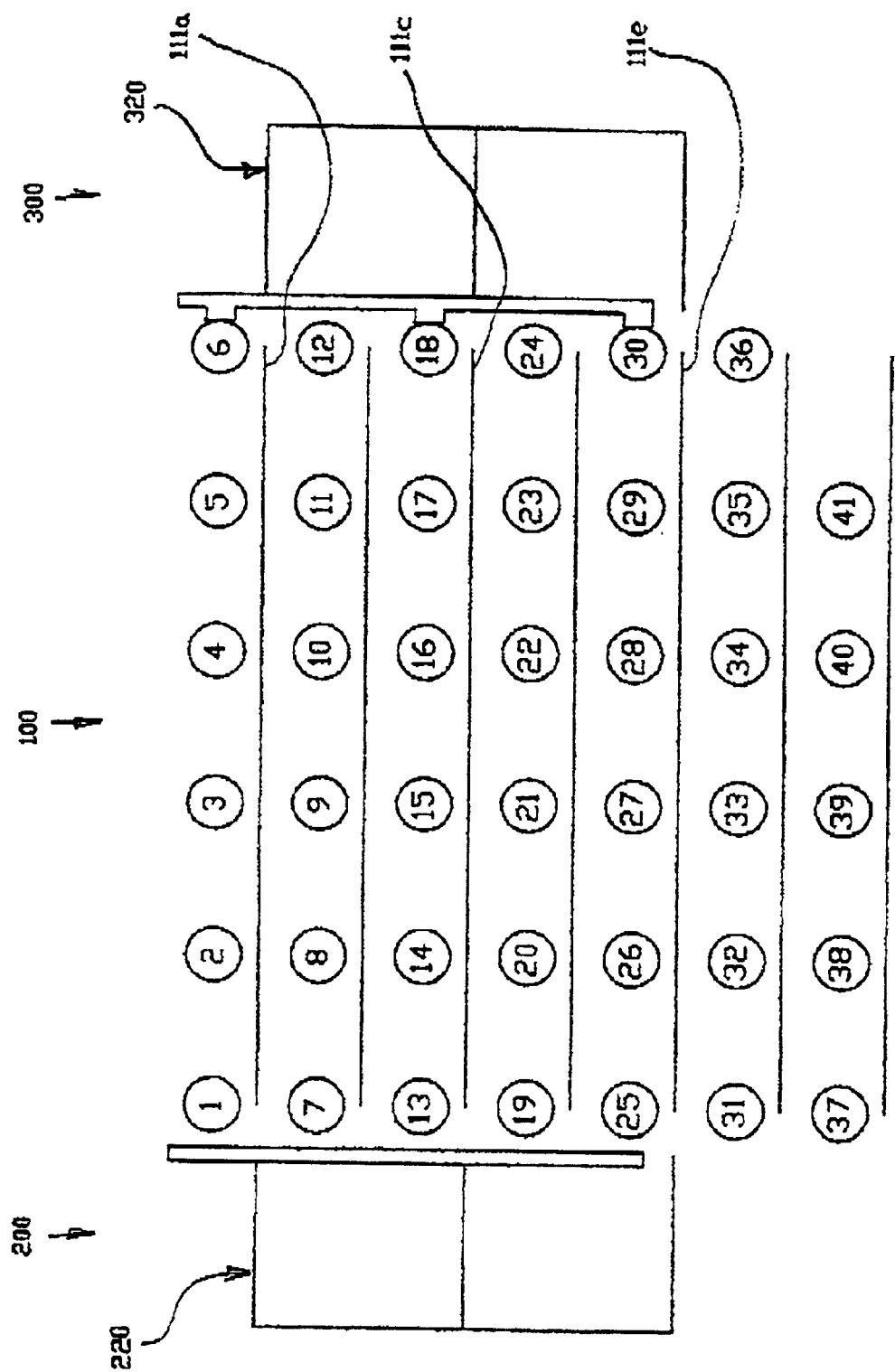
FIGS. 5A–5M are schematic views of the advancement of pallets through one cycle of the elevators in accordance with the preferred embodiment present invention.
Figure 5C:
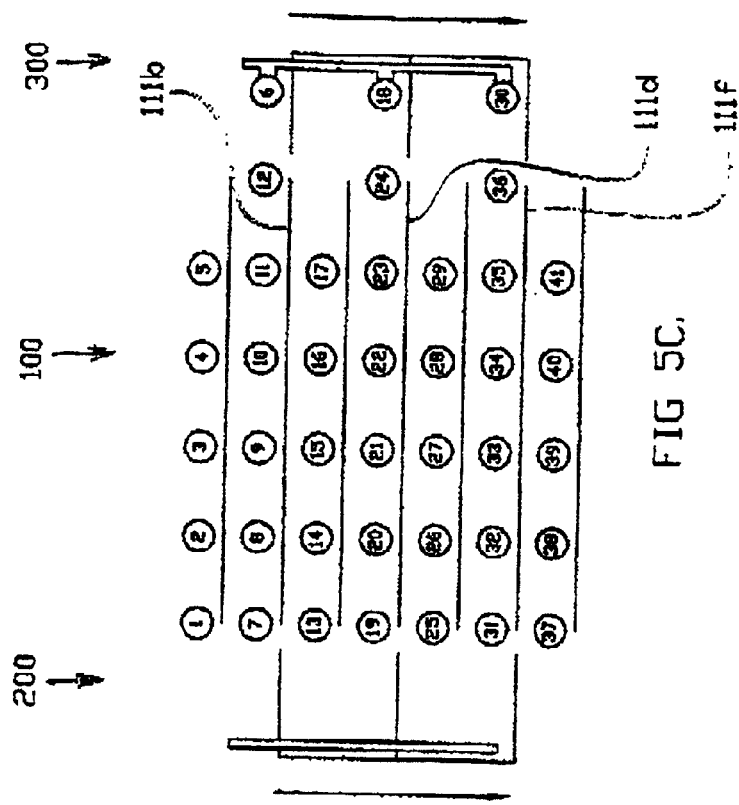
Figure 5B:
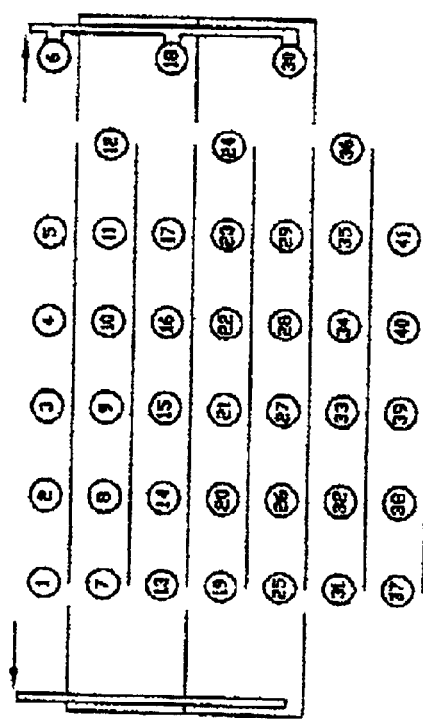

Referring now to FIGS. 5A–B, pallets 6, 18, and 30 are removed (as described above) from levels 111a, 111c, and 111e, respectively by each of the three second transfer means 320 of second elevator 300.

Referring to FIG. 5C, first and second elevators 200, 300 move down one level, such that transfer means 220, 320 align with levels 111b, 111d, and 111f.

Figure 5E:
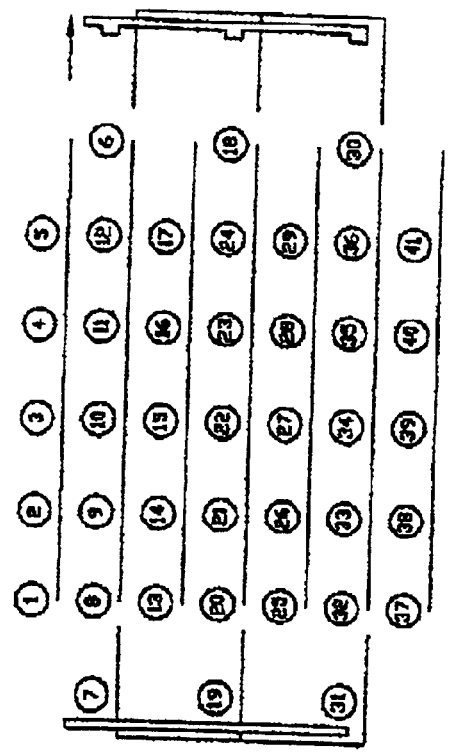
Figure 5D:
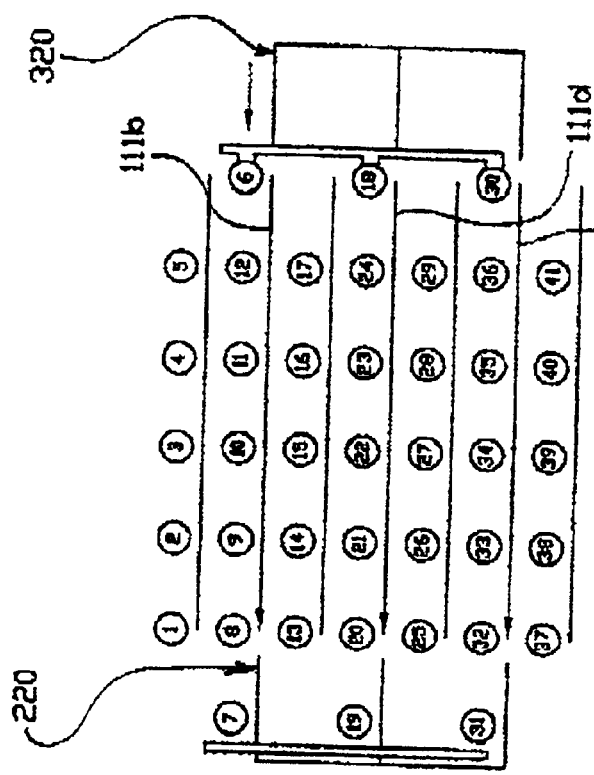

Referring to FIGS. 5D–E, second transfer means 320 insert pallets 6, 18, and 30 onto levels 111b, 111d, and 111e, respectively. The insertion also advances all of the pallets on those levels toward first elevator 200, such that pallets 7, 19, and 31 are pushed onto each of the first transfer means 220.

Figure 5G:
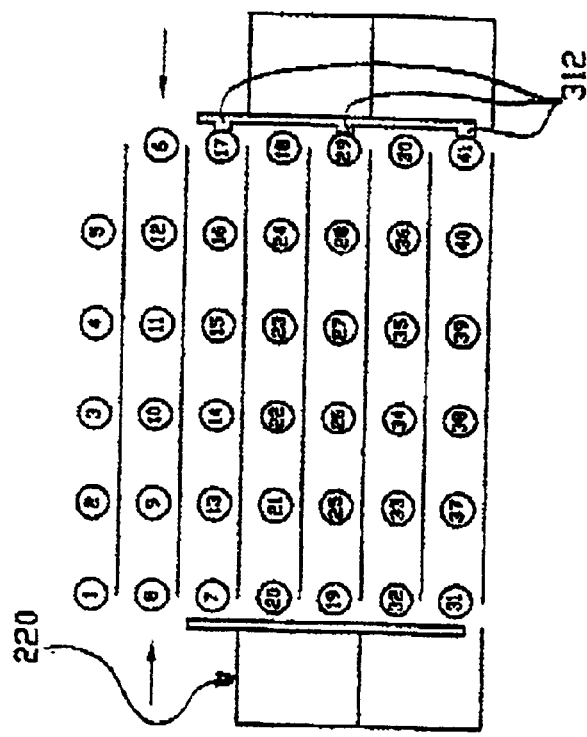
Figure 5F:
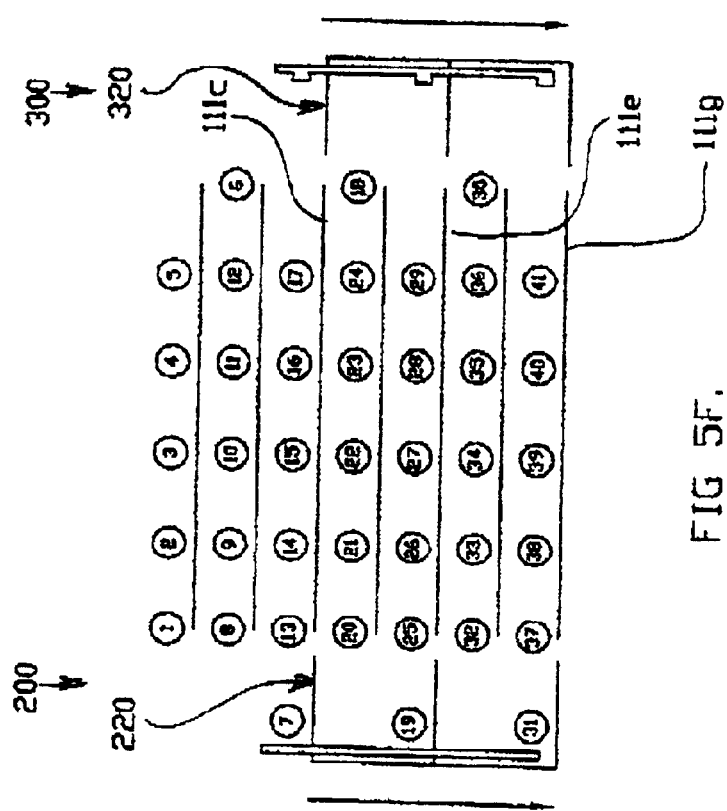

Referring to FIG. 5F, first and second elevators 200, 300 move down one level such that transfer means 220, 320 align with levels 111c, 111e, and 111g.

Referring now to FIG. 5G, first transfer means 220 insert pallets 7, 19, and 31 onto levels 111c, 111e, and 111g, respectively, thereby advancing all of the pallets on those levels toward second elevator 300. Pallets 17, 29, and 41 are advanced adjacent to second elevator 300, where grapple mechanism 312 of each second transfer means 320 engages the pallets 17, 29, and 41.

Figure 5I:
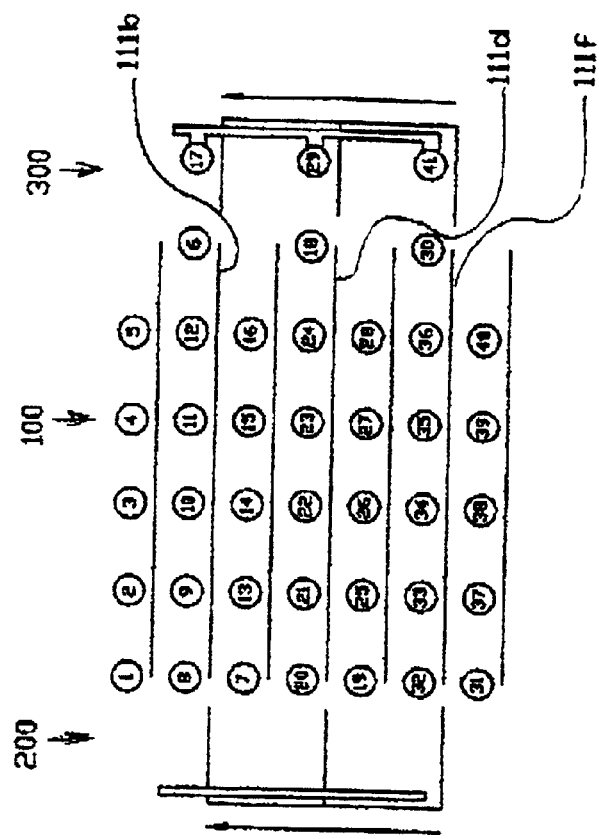
Figure 5H:
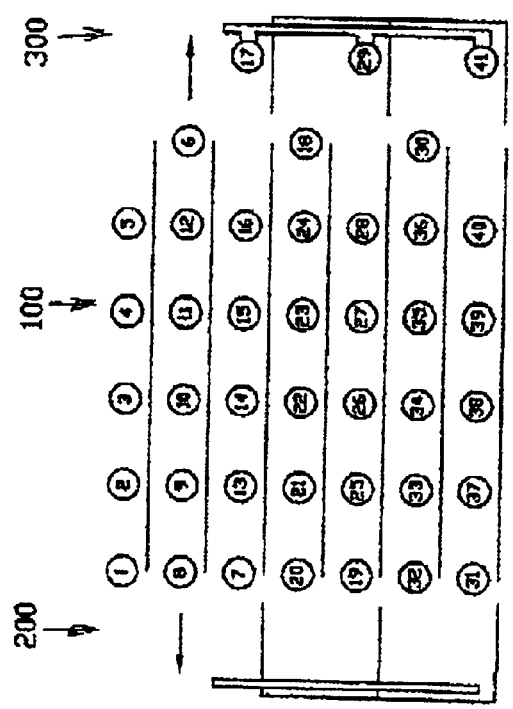

Referring to FIGS. 5H–I, pallets 17, 29, and 41 are removed onto second elevator 300, and first and second elevators 200, 300 move up one level to align with levels 111b, d, and f of the conveyor 100.

Figure 5K:
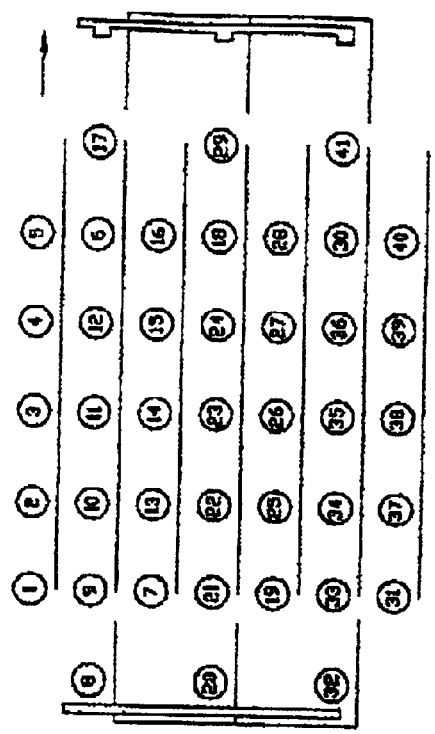
Figure 5J:
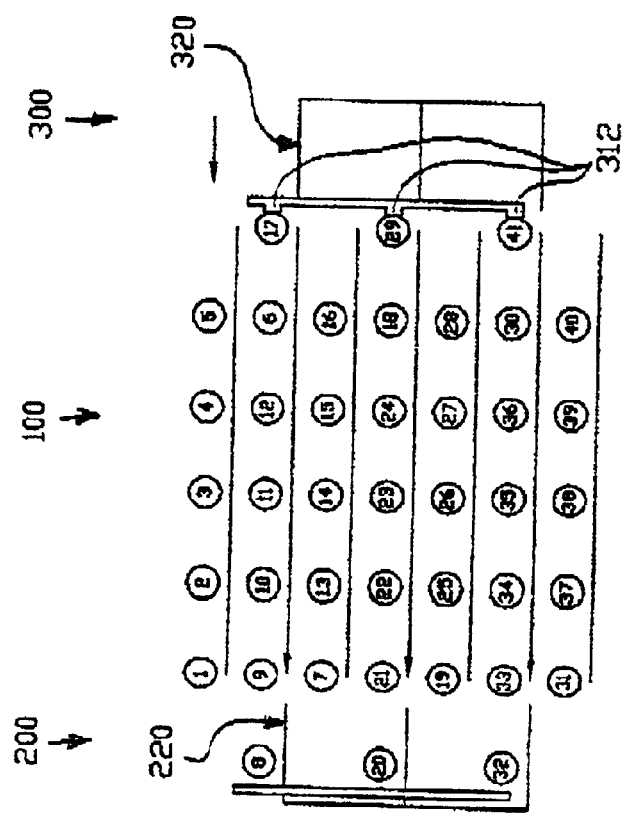

Referring to FIGS. 5J–K, pallets 17, 29, and 41 are inserted at levels 111b, d, and f, while at the same time grapple mechanism 312 releases the pallets. The insertion of pallets 17, 29, and 41 advances all of the pallets on those levels, such that pallets 8, 20, and 41 are moved onto the first transfer means 220 of first elevator 200.

Figure 5M:
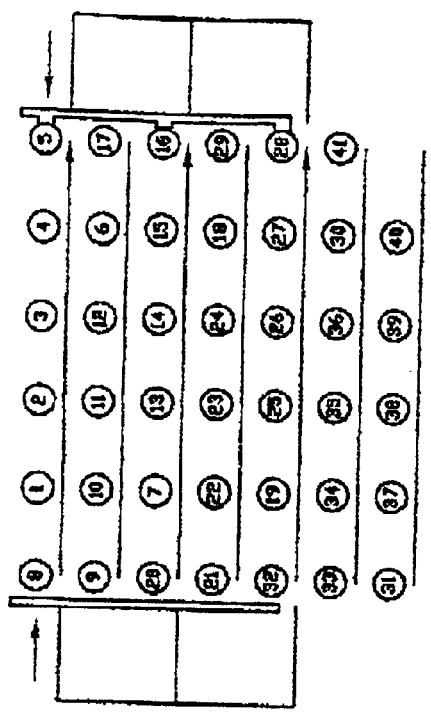
Figure 5L:
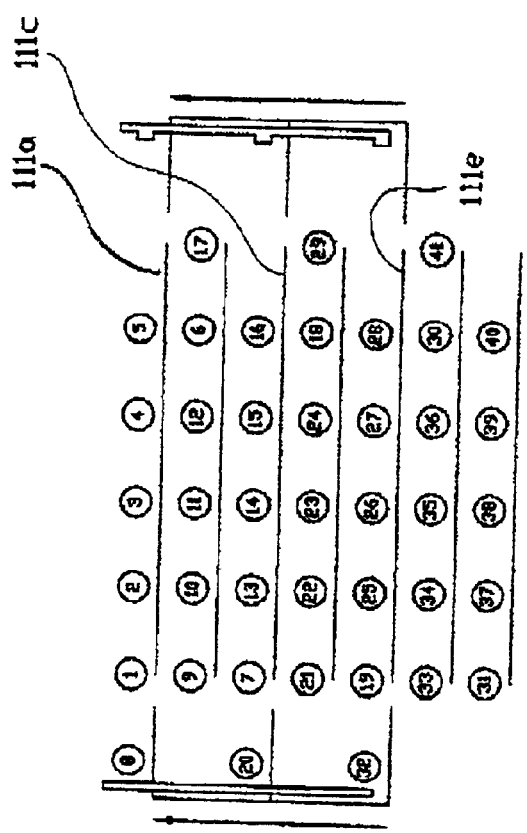

Referring to FIGS. 5L–M, pallets 8, 20, and 41 move up one level to align with levels 111a, c, and e and are inserted on these levels.

Grapple mechanism 312 engages pallets 5, 16, and 28, and the cycle repeats.

Figure 6C:
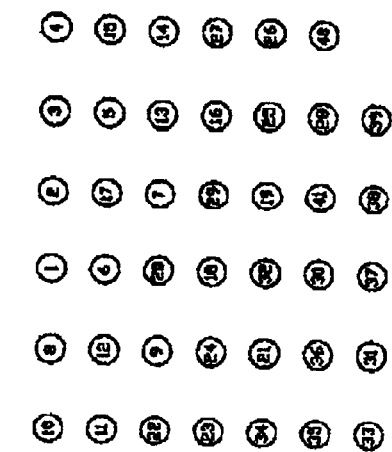
FIGS. 6A–F are schematic views of the advancement of pallets through several cycles of the elevators, in accordance with the preferred embodiment of the present invention.
Figure 6F:
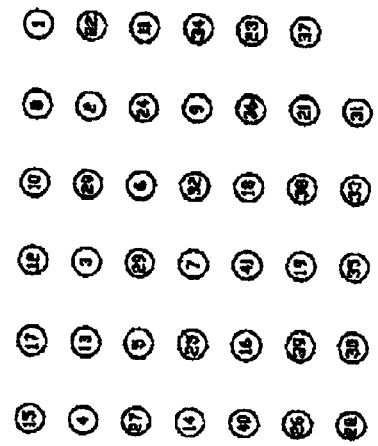
Figure 6B:
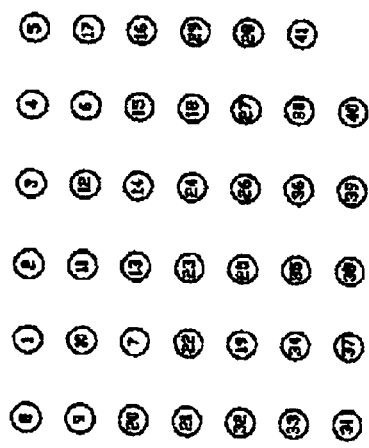
Figure 6E:
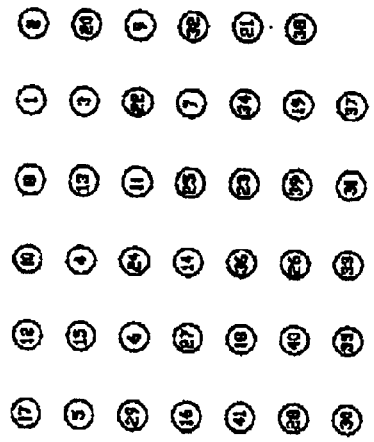
Figure 6A:
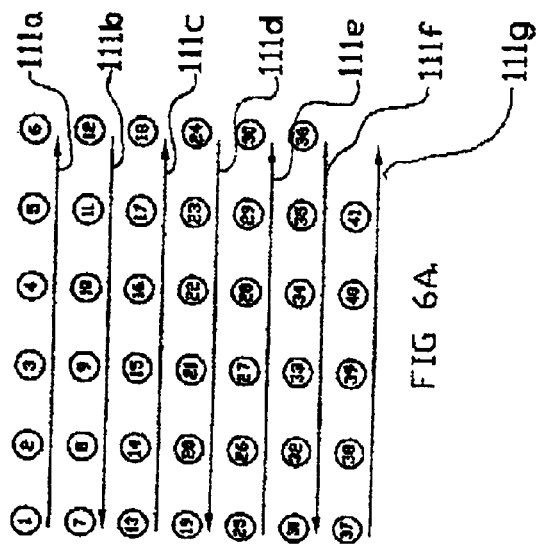
Figure 6D:
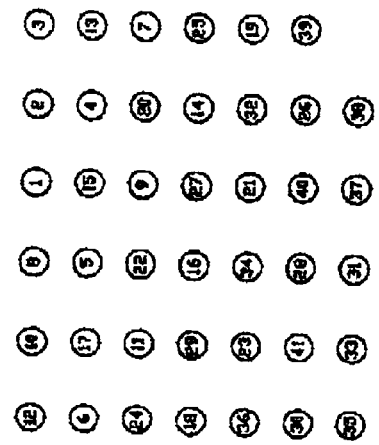

FIGS. 6A–E show the pattern of movement of the pallets through several cycles of the elevators 200, 300, in accordance with a preferred embodiment of the invention. In particular, on levels 111a, c, e, and g, the pallets move from left to right while on levels 111b, d, and f, the pallets move in the opposite direction. For example, pallet 2 is shown in FIG. 6A in the starting position and moves sequentially to the right, as shown in FIGS. 6B–E. Referring to FIG. 6F, pallet 16 is transferred to level 111b, where it moves to the left. Pallet 41 is shown in the end position in FIG. 6A. As shown in FIG. 6B, pallet 41 is transferred to level 111f. Pallet 41 then moves to the left along 111f, as shown in FIGS. 6C–F, as it returns to the starting position. It will be understood by those skilled in the art that any position may be chosen as the starting position.

The described above cycle can be broken down into a number of basic procedures, which consist of lowering or raising the elevator with pallets one or more levels. This basic procedure can be performed many times. Changing the sequence in which one basic procedure is done after another allows to control the path of a pallet inside the system, thus, making it possible to predetermine and differ Paths for any specific group of pallets. This allows one group pallets loaded with the same product to undergo one treatment, while another group of pellets loaded with another product can undergo a different treatment. As a result of altering paths, relative position of any one pallet comparative to another can be varied according to the requirements.

Referring again to FIGS. 5A–M, when the elevators 200, 300 are empty (i.e. no pallets on platforms 203, 303), there is preferably an even number of pallets on each level 111b–f. However, the preferred embodiment of the present invention does not require the number of pallets 103 on levels 111b–f to be equal, provided there is an even number of pallets 103 on each level 111b–f. An even number of pallets 103 is not required for the top and bottom levels 111a and 111g, respectively.

The present invention increases the conveyance path over prior art multi-level conveyors by returning the pallets to the starting position through the conveyor rather than using a separate apparatus outside the conveyor. Furthermore, the present invention increases the output of the conveyor by utilizing first and second elevators 200, 300 which can transfer multiple pallets between levels simultaneously. In a preferred embodiment of the invention, multiple pallets are transferred by multiple transfer means 220, 320 on each of the first and second elevators 200, 300. In order to increase output in a system with one transfer means per elevator, a more complex and costly elevator and transfer means is required. Even with additional complexity and expense, the output of a conveyor using elevators with one transfer means is limited. Consequently, the present invention provides the advantage of maintaining output even as the number of levels on the conveyor are increased by increasing the number of transfer means.

While the present invention as herein shown and described in detail is fully capable of attaining the above-described objectives of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims.

What is claimed is:

1. A conveying apparatus comprising:
   a) a conveyor comprising a plurality of levels;
   b) a plurality of pallets movably located on said levels of said conveyor;
   c) a first elevator adapted to move between said plurality of levels along a first end of said conveyor, wherein said first elevator comprises first transfer means adopted to receive and to push pallets;
   d) a second elevator adapted to move between said plurality of levels along a second end of said conveyor wherein said second elevator comprises second transfer means adopted to push and to receive said pallets;
   e) said first and second elevators said plurality of pallets from said one level to another level;
   f) said first and second elevators move simultaneously to cooperatively advance said plurality of pallets, in a number of predetermined and possibly different paths along said levels of said conveyor, wherein a possibility of changing order of said pallets in relationship to one another exists.

2. The conveying apparatus of claim 1, wherein said first transfer means comprises a first platform adapted to receive one of said predetermined number of pallets and a pusher adapted to push said one pallet from said first platform, wherein said second transfer means comprises a second platform and a second pusher adapted to push said one pallet from said second platform.

3. The conveying apparatus of claim 2, wherein said first and second pushers each comprise a push bar slidably connected thereto, said push bar being adapted to bear against said one pallet.

4. The conveying apparatus of claim 3 further comprising a first lift mechanism adapted to move said first elevator and a second lift mechanism adapted to move said second elevator.

5. The conveying apparatus of claim 4, wherein said first and second lift mechanisms each comprise a vertical slide ball screw system.

6. The conveying apparatus of claim 5, wherein said first and second transfer means each comprise a horizontal slide ball screw system for movement thereof.

7. The conveying apparatus of claim 1 further comprising:
   a) a loading station proximate to said conveyor, said loading station being adapted to load a product on one of said plurality of pallets;
   b) an unloading station located downstream of said loading station, said unloading station being adapted to unload said product after treatment thereof;
   c) an assembly station proximate to said conveyor, said assembly station adapted to perform an assembly operation on said product; and
   d) a viewing station located downstream of said assembly station, said viewing station being adapted to detect defective assembly and remove defective products.

8. A conveying apparatus comprising:
   g) a conveyor comprising a plurality of levels;
   h) a plurality of pallets movably located on said levels of said conveyor;
   i) a first elevator adapted to move between said plurality of levels along a first end of said conveyor, said first elevator comprising a plurality of first transfer means for moving a predetermined number of said plurality of pallets from at least two of said plurality of levels to at least two other of said plurality of levels simultaneously;
   j) a second elevator adapted to move between said plurality of levels along a second end of said conveyor; said second elevator comprising a plurality of second transfer means for moving said predetermined number of said plurality of pallets from said at least two levels to said at least two other levels simultaneously: wherein said first and second transfer means cooperatively advance said plurality of pallets in a number of predetermined paths;
   k) wherein the number of said plurality of first transfer means is equal to the number of said plurality of second transfer means;
   l) wherein the number of said plurality of levels on said conveyor is calculated in accordance with the equation $N_L = N_t \times A + 1$, where $N_L$ is the number of levels, $N_t$ is the number of transfer means on one of the elevators, and A is the number of levels between each transfer means.

9. A method of moving a plurality of objects on a conveyor having a plurality of levels, two elevators on each side and pusher means, the method comprising the steps of:
   a) sequentially moving said plurality of objects in a number of predetermined and possibly different paths along said levels of said conveyor, wherein a possibility of changing order of said plurality of objects in relationship to one another exists;
   b) each of said two elevators moving one or more of said objects simultaneously from one level to another in upward or in downward directions along said ends of said conveyor;
   c) advancing said plurality of objects along said levels by said gusher means;
   d) retracing a portion of an object's path during said one cycle.

* * * * *